(12) United States Patent
Jarvenpaa et al.

(10) Patent No.: US 9,766,381 B2
(45) Date of Patent: Sep. 19, 2017

(54) LIGHT-GUIDING STRUCTURES

(75) Inventors: Toni J. Jarvenpaa, Toijala (FI); Pasi Riso Olavi Saarikko, Espoo (FI)

(73) Assignee: Nokia Technologies Oy, Espoo (FI)

( * ) Notice: Subject to any disclaimer, the term of this patent is extended or adjusted under 35 U.S.C. 154(b) by 866 days.

(21) Appl. No.: 13/634,080

(22) PCT Filed: Mar. 12, 2010

(86) PCT No.: PCT/FI2010/050192
§ 371 (c)(1),
(2), (4) Date: Dec. 18, 2012

(87) PCT Pub. No.: WO2011/110728
PCT Pub. Date: Sep. 15, 2011

(65) Prior Publication Data
US 2013/0088780 A1   Apr. 11, 2013

(51) Int. Cl.
*G02B 5/18* (2006.01)
*G02B 27/01* (2006.01)
*G02B 6/00* (2006.01)

(52) U.S. Cl.
CPC ........... *G02B 5/18* (2013.01); *G02B 27/0172* (2013.01); *G02B 6/00* (2013.01); *G02B 2027/0134* (2013.01); *G02B 2027/0174* (2013.01)

(58) Field of Classification Search
CPC ........ G02B 5/18; G02B 27/0172; G02B 5/32; G02B 6/0016; G02B 6/0033; G02B 27/0081; G02B 27/0103; G02B 6/00
USPC .......... 359/15, 281, 298, 566; 362/606, 615; 385/37, 146, 147
See application file for complete search history.

(56) References Cited

U.S. PATENT DOCUMENTS

| 7,098,871 | B1 * | 8/2006 | Tegreene et al. ................. 345/7 |
| 2008/0117289 | A1 * | 5/2008 | Schowengerdt ..... G02B 26/005 348/46 |
| 2010/0134534 | A1 * | 6/2010 | Seesselberg ......... G02B 6/0038 345/690 |

FOREIGN PATENT DOCUMENTS

| FI | WO 2006064301 | A1 * | 6/2006 | ............... G02B 5/32 |
| GB | 2 458 865 | A | 11/2008 | |
| JP | WO 2006098097 | A1 * | 9/2006 | ......... G02B 27/0081 |
| WO | WO 2006/064301 | A1 | 6/2006 | |
| WO | WO 2007/141587 | A1 | 6/2006 | |
| WO | WO 2006064301 | A1 * | 6/2006 | |
| WO | WO 2006/098097 | A1 | 9/2006 | |
| WO | WO 2009/077803 | A1 | 12/2007 | |

(Continued)

OTHER PUBLICATIONS

Saarikko, P.; "Diffractive exit-pupil expander for spherical light guide virtual displays designed for near-distance viewing"; Journal of Optics A: Pure and Applied Optics, vol. 11, No. 6; 2009; whole document (10 pages).

(Continued)

*Primary Examiner* — Scott J Sugarman
*Assistant Examiner* — Mustak Choudhury
(74) *Attorney, Agent, or Firm* — Harrington & Smith

(57) ABSTRACT

A method and an apparatus for providing a first light-guiding structure and a second light-guiding structure to receive an input optical beam and output an output optical beam to be viewed by a user. At least one of the first or the second light-guiding structure has a non-flat shape. The first and the second light-guiding structures are configured to produce virtual images at different viewing distances.

17 Claims, 4 Drawing Sheets

(56) References Cited

FOREIGN PATENT DOCUMENTS

| WO | WO 2008/023375 A | 2/2008 |
|----|------------------|--------|
| WO | WO 2009/077802 A1 | 6/2009 |

OTHER PUBLICATIONS

Saarikko, P., "Diffractive exit-pupil expander for spherical light guide virtual displays designed for near-distance viewing", Journal of Optics A: Pure and Applied Optics, vol. 11, No. 6, abstract only, 1 page.

* cited by examiner

LIGHT-GUIDING STRUCTURES

TECHNICAL FIELD

The present invention generally relates to light-guiding structures. The invention relates particularly, though not exclusively, to exit pupil expanders (EPE) with spherical or aspheric non-flat substrates.

BACKGROUND ART

Presently, light guide based near-to-eye displays utilizing diffractive exit pupil expanders (EPE) are suitable for generation of virtual images to a fixed viewing distance. Because of the use of transparent light guides, such displays can be operated in a see-through mode to enable the generated images to be viewed simultaneously with the physical background. This enables a direct route for implementation of augmented reality applications where virtual information is overlaid on top of the physical scenery. However, for simultaneous viewing of physical and virtual objects their convergence and accommodation distance should to match. This means that the display system should allow adjustable viewing distance to bring the virtual information to coincide with physical objects.

Near-to-eye displays have to be able to create multiple viewing distances simultaneously. Unfortunately, for near-distance objects, each object point is replicated in the exit pupil expander (EPE) plate, which is seen as pixel blurring in the virtual display. For example, if the imaging optics of the near-to-eye display is designed to provide an input image at a finite viewing distance, each display pixel will consist of a range of ray angles. When coupled into a planar exit pupil expander (EPE) the whole range of incident ray angles will emerge from all the ray-interception points along the out-coupling grating. Thus, a single display pixel will appear to be replicated or blurred when observed through the exit pupil expander (EPE). The limitation of infinite viewing distance may be a problem for near-sighted people. In particular, in mobile applications compact eyeglass type near-to-eye displays are preferred that are not well suited for wearing with regular eyeglasses. Furthermore, the limitation of infinite image distance can lead to significant reduction in the viewing experience and limit the range of potential applications, such as stereoscopic 3D (3-dimensional) viewing.

SUMMARY

According to a first example aspect of the invention there is provided an apparatus comprising:
- a first light-guiding structure configured to guide optical waves, having a first surface and a second surface which is opposite to the first surface;
- a second light-guiding structure configured to guide optical waves, having a first surface and a second surface which is opposite to the first surface;
- an in-coupling element disposed on the first or the second surface of the first or the second light-guiding structure and configured to receive an input optical beam;
- an out-coupling element disposed on the first or the second surface of the first or the second light-guiding structure and being offset from the said in-coupling element and configured to output an output optical beam out of the first or the second light-guiding structure to be viewed by a user;
- wherein at least one of the first or the second light-guiding structure has a non-flat shape, and
- the first and the second light-guiding structures are respectively configured to produce virtual images at different viewing distances.

According to a second example aspect there is provided a method comprising:
- receiving an input optical beam by at least one of a first light-guiding structure and a second light-guiding structure;
- outputting an output optical beam to be viewed by a user, wherein at least one of the first or the second light-guiding structure has a non-flat shape; and
- configuring the first and the second light-guiding structures to produce virtual images at different viewing distances.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

With the use of cylindrically or spherically shaped exit pupil expander (EPE), virtual image can be generated at finite viewing distance (for example close focus). Unfortunately, spherical exit pupil expander (EPE) technology can be used for creation of an image plane at a single viewing distance, only. This makes it possible to improve augmented reality and stereo functionality for near distance objects. However, the system is then unsuited for far distance augmentation, which is important for outdoor use cases. Problem exists for simultaneous display at multiple distances.

Stereo version of the near-eye-display would require that each eye would be shown a different image. This is achievable with a conventional setup of two micro displays as image sources, or with some more complex time multiplexing with one display source. With stereo displays when disparity is introduced in the content, accommodation-convergence mismatch is typically a problem.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1A:
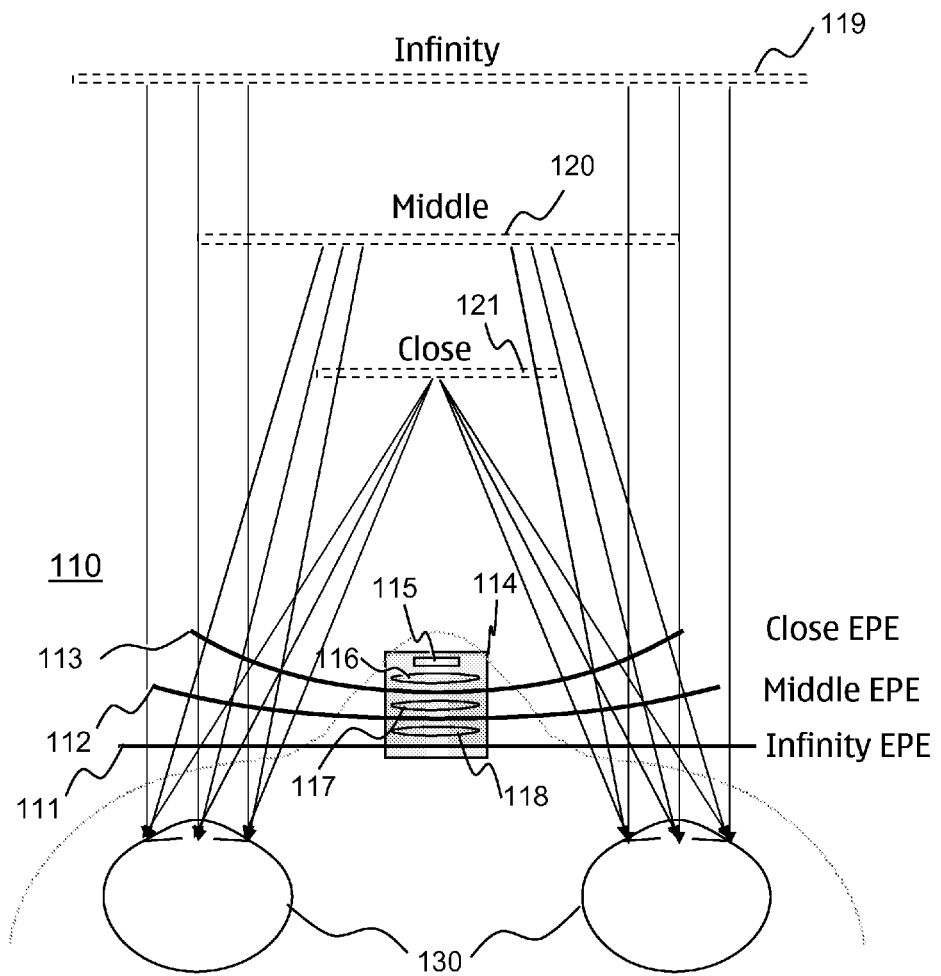
FIG. 1a shows a schematic picture of a system according to an example embodiment of the invention with multiple exit pupil expanders (EPE) where each exit pupil expander (EPE) creates a different focus distance.

FIG. 1a shows a schematic picture of an apparatus 110 according to an example embodiment of the invention. The apparatus 110 produces virtual images at different distances to user's eyes 130. The apparatus 110 may also enable augmented reality viewing when used in see-through optical mode.

The apparatus 110 may be understood as a mere optical display circuitry or a larger entirety such as virtual reality system in different example embodiments of the invention. For the sake of simplicity of description, let us assume that the apparatus 110 is a display unit with optical functionality and digital image processing capability. The apparatus 110 may be capable of displaying virtual reality content and metadata. The apparatus 110 may also be capable of downloading additional virtual reality content and metadata over a wireless or wired connection and storing it into the apparatus 110 for displaying.

In one example embodiment of the invention, the apparatus 110 includes multiple light-guiding structures 111,112, 113 configured to guide optical waves. These light-guiding structures 111,112,113 may be understood as any light-guiding structures that are capable of optically presenting a virtual image together with an optical engine 114. Optical engine 114 may control input optical beams and provide adjustable optical power. The light-guiding structures 111, 112,113 may comprise exit pupil expander (EPE), glass, plastic, thin strong polyester film (such as Mylar), or the like. Light-guiding structure 111,112,113 may also comprise a micro lens array (MLA) or a moulded liquid polymer. For the sake of simplicity of description, let us assume that the light-guiding structure 111,112,113 is an exit pupil expander (EPE). The optical engine 114 may include a display unit 115, shutters (not shown in FIG. 1a) and multiple lenses 116,117,118. The display unit 115 and shutters may also be included as separate elements to optical engine 114 and optical engine 114 may include only one or more lenses 116, 117, 118.

The different exit pupil expanders (EPE) may have different focal distances or curvature radii. Typically, curvature radius of the non-flat shape defines a focal distance. Light beams corresponding to a virtual image, at a given depth 119, 120, 121, are transmitted through the exit pupil expander (EPE) 111, 112, 113 with a matching focal distance. Target is to achieve the desired focus and convergence for biocular (viewing to provide same image to both eyes) or binocular (viewing to provide different image, not necessary stereo, to different eyes) viewing. In augmented reality use cases, the effect of accommodation-convergence mismatch may be reduced. The exit pupil expander (EPE) plate 111 may have a flat (for example planar) shape and the other plates 112,113 may have non-flat, for example spherical, curved or aspheric, shape. In one embodiment of the invention all exit pupil expander (EPE) plates 111, 112, 113 may have non-flat or curved shape and further wherein the curvature radii of the exit pupil expander (EPE) plates 111, 112, 113 may be different.

Each exit pupil expander (EPE) plate 111,112,113 may present different two-dimensional image at a different depth 119,120,121. When viewing the images, user's eyes 130 focus and converge on the images at different depths 119, 120,121 and observe real (layered) depth. In one embodiment of the invention the curvature radius is the same for the opposite surfaces of at least one of the light-guiding structures.

Figure 1B:
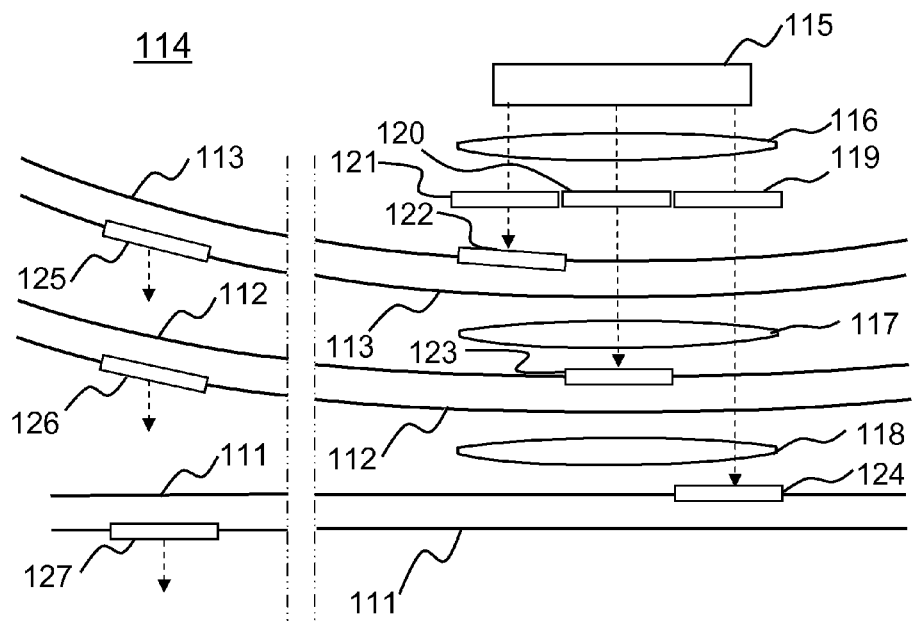
FIG. 1b shows a schematic picture of an optical system and multiple exit pupil expanders (EPE)

FIG. 1b describes a schematic picture of the optical engine 114. Control of the viewing distance of any near-eye-display may employ an optical engine 114 with adjustable optical power, for example a zoom lens or other optical system with adjustable optical path. Zoom optics are typically bulky and slow, which makes them challenging for near-eye-display applications. Using a stack of exit pupil expanders (EPE) of different curvature radii provides a simpler and compact method for realizing the required optical power adjustment. It is appreciated that ideally the image distance is correct for all exit pupil expanders (EPE). This means that the optical engine 114 may provide separate optical power for the separate exit pupil expanders (EPE).

The exit pupil expanders (EPE) are used in combination with the optical engine 114 to achieve multiple focal lengths. In FIG. 1b, the first exit pupil expander (EPE) 113 is used to extract light from the optical system at a location with matching optical power as compared with its curvature radius. Optical power may be set by using the lens 116 between the display 115 and the first exit pupil expander (EPE) 113. Additional lenses 117,118 are incorporated after the first exit pupil expander (EPE) 113 to adjust the optical power of the combined system to match the curvature radius of the second exit pupil expander (EPE) 112 and of the third exit pupil expander (EPE) 111. Multiple lenses may also be incorporated in the place of any of the lenses 116, 117, 118 of the FIG. 1b.

In one example embodiment of the invention, only one set of input rays corresponding to a given image distance is allowed to be coupled into the respective exit pupil expander (EPE). No cross-talk may be allowed between different viewing distances in this example embodiment of the invention. Furthermore, the system may include a way to switch between the different image distances.

In one example embodiment of the invention, the distance and cross-talk control is achieved by aligning the in-coupling elements 122,123,124, for example gratings, so that the in-coupling elements do not overlap with each other. Furthermore, a set of shutters 119,120,121, for example liquid crystal shutters, may be placed and aligned with the in-coupling gratings 122,123,124. By switching the shutter states in a complementary fashion (on-off-off, off-on-off, off-off-on) the propagation path of the light can be switched between exit pupil expander (EPE) plate 1, exit pupil expander (EPE) plate 2 and exit pupil expander (EPE) plate 3, and for example the viewing distance may be changed. Light beam from the display 115 may be targeted to the in-coupling gratings 122,123,124 sequentially and the image content may be synchronized accordingly.

A light beam from the display 115 may pass a relevant shutter 119,120,121 and refracted by lens system 116,117, 118 before entering as an input optical beam to a corresponding exit pupil expander (EPE) plate 111,112,113 using in-coupling grating 122,123,124. Output optical beam exits the exit pupil expander (EPE) plate 111,112,113 using out-coupling element 125,126,127. The out-coupling element 125,126,127 may be a diffraction grating.

Accordingly, the apparatus 110 according to this example embodiment of the invention may have a characterization that the radius of curvature for the exit pupil expander (EPE) plate corresponds to the focal distance. This means that the focal point may be changed to be finite, which means that all the out-coupled beams seem to emanate from this focal point. The ergonomics of the optical device is thus improved, because it is more comfortable for an observer to observe an image that appears to be at a distance shorter than infinity.

It should be noted that each of the out-coupling elements 125,126,127 may be a holographic diffractive element or a diffractive optical element. As the name suggests, a holographic diffraction element is holographically produced where at least two coherent light beams are used to produce interference fringes. In contrast, a diffraction optical element can be produced mechanically or chemically. The exit pupil expander (EPE) as shown in FIG. 1b can have two or more out-coupling elements. Both types of elements are based on periodic structures, while the structures in the diffractive optical elements are generally simpler and usually surface relief structures. In contrast to that, holographic diffractive elements are typically volume structures, which mean that they can have a depth much more than the used wavelengths.

The out-coupling element 125,126,127 may be laterally displaced along the major plane of the exit pupil expander (EPE) plate 111,112,113 from the corresponding in-coupling element 122,123,124 and serve for out-coupling optical waves out of said exit pupil expander (EPE) plate 111,112, 113 in a way described in the following, for instance.

The transfer of the light-waves from in-coupling element 122,123,124 to out-coupling element 125,126,127 proceeds by means of total internal reflection within the exit pupil expander (EPE) plate 111,112,113.

As further can be shown from FIG. 1a and FIG. 1b, the exit pupil expander (EPE) plate 112,113 may not be of a planar shape but may have a specific curvature radius. In FIGS. 1a and 1b, both major surfaces of the exit pupil expander (EPE) plate 112,113 have a common centre of curvature. The curvature radius of the exit pupil expander (EPE) plate 112,113 may be designed in a way that the observer's eye focuses the image not from infinity but from finite distance because the curvature radius is corresponding to the focus viewed by the observer. For example, it may be desired that the observer view the object in a range between 0.5 m and infinity, preferably at a distance of 1 m. This should be more comfortable to the observer than to observe the image in a very short distance, for example 5 cm, or at a very long distance, for example infinity.

In one example embodiment of the invention, the viewing distance of the object may be changed dynamically, if the curvature radius of the curved exit pupil expander (EPE) plate is changeable and can be controlled. This may allow for adjustment of the viewing object distance to match the actual or a desired viewing distance. Actual viewing distance can be measured in real time with stereoscopic gaze tracking. Desired viewing distance may be related to a measured location of the augmentable objects. Measuring may be done, for example, with camera, global positioning system (GPS), orientation sensor or such. In one example embodiment of the invention, the curvature radius for at least one exit pupil expander (EPE) plate may be fixed and the curvature radius for at least one exit pupil expander (EPE) plate may be changeable.

In another example embodiment of the invention, the apparatus 110 may include a first exit pupil expander (EPE) plate 111 having a flat shape. A second plate 112,113 may have non-flat, for example spherical or aspheric, shape and the curvature radius of the plate can be controlled dynamically based on the desired viewing distance. Control of the viewing distance of any near-eye-display may employ an optical engine 114 with adjustable optical power to match the dynamic viewing distance. In further embodiment of the invention, multiple of dynamically controlled non-flat exit pupil expander (EPE) plates 112, 113 may be incorporated to the apparatus 110.

Figure 2:
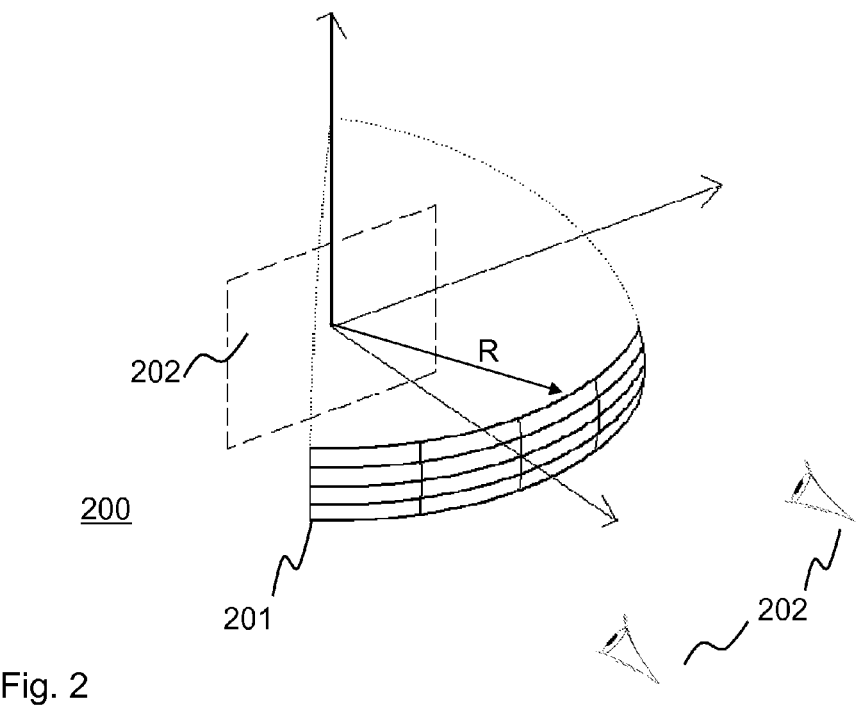
FIG. 2 shows a schematic representation demonstrating a geometry of a near focus exit pupil expander (EPE) with a spherical shape, according to an embodiment of the present invention.

FIG. 2 describes the geometry of the near-focus exit pupil expander (EPE) plate 200. The exit pupil expander (EPE) plate shape may be modified to be non-flat. For example, the shape might be a section of a spherical or curved shell 201 with a radius R equal to the desired focus distance, for example the viewing distance of the virtual display. The object plane 202 is at the focal plane of the spherical exit pupil expander (EPE) section and the observer 203 is looking at the virtual image through the exit pupil expander (EPE) plate 200 towards the focal plane 202. The input image may be a virtual image of a micro display (not shown in FIG. 2) that is placed next to the input section of the exit pupil expander (EPE) plate 200. Moreover, the virtual image of the micro display may be located at the focal plane of the spherical exit pupil expander (EPE) section.

Figure 3:
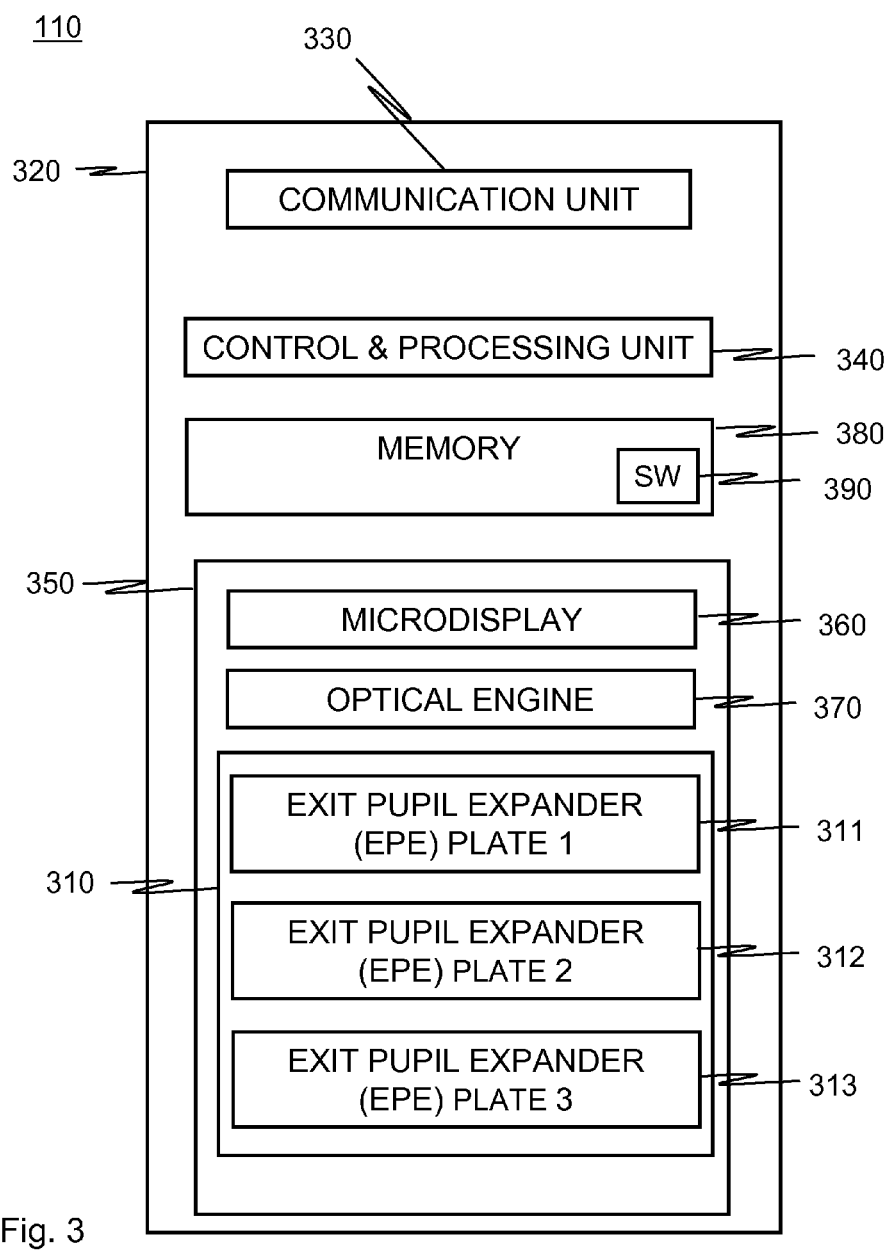
FIG. 3 shows a block diagram of an apparatus according to another example embodiment of the invention.

FIG. 3 shows an example of a schematic representation of the apparatus 110, having the non-flat exit pupil expander (EPE) system 310, according to an embodiment of the present invention.

The exit pupil expander (EPE) system 310 may comprise several exit pupil expander (EPE) plates 311,312,313. The exit pupil expander (EPE) system 310 may be used with an electronic (for example portable) apparatus 110, as an additional or primary display of the electronic apparatus 110. The electronic apparatus 110 may be selected from the group consisting of: a mobile phone, personal digital assistant (PDA), communicator, portable Internet appliance, handheld computer, digital video and still camera, wearable computer, computer game device, specialized bring-to-the-eye product for viewing and other portable electronic devices. As shown in FIG. 3, the apparatus 110 has a housing 320 to house a communication unit 330 for receiving and transmitting information from and to an external device (not shown). The apparatus 110 also has a controlling and processing unit 340 for handling the received and transmitted information, and a virtual display system 350 for viewing. The virtual display system 350 includes a micro-display or an image source 360 and an optical engine 370. Optical engine 370 may include lenses 116, 117, 118 and shutters 119, 120, 121 as shown in FIG. 1b. The controlling and processing unit 340 is operatively connected to the optical engine 370 to provide image data to the image source 360 to display an image thereon. The exit pupil expander (EPE) 310, according to an example embodiment of the invention, may be optically linked to an optical engine 370 using in-coupling elements 122, 123, 124.

Furthermore, the image source 360, as depicted in FIG. 3, can be a sequential color liquid crystal on silicon device, an organic light emitting diode (LED) array, a micro-electro-mechanical system device or any other suitable micro-display device operating in transmission, reflection or emission.

Moreover, the exit pupil expander (EPE) 310, according to an example embodiment of the invention, can also be used in a non-portable device, such as a gaming device, vending machine or home appliances, such as an oven, microwave oven and other appliances and other non-portable devices.

The apparatus 110 further comprises a memory 380 coupled to the processor 340. The apparatus further comprises software 390 stored in the memory 380 and for loading and executing by the processor 340. The software 390 may comprise one or more software modules. The software 390 can be in the form of a computer program product.

The communication unit 330 may be, e.g., a radio interface module, such as a wireless local area network (WLAN), Bluetooth, global system for mobile communications (GSM), general packet radio service (GPRS), code division multiple access (CDMA), wideband code division multiple access (WCDMA), or long term evolution (LTE) radio module. The communication unit 330 may be also a wired interface module, such as a universal serial bus (USB), recommended standard 232 (RS-232) or high definition multimedia interface (HDMI). The communication unit 330 may be integrated into the apparatus 110 or into an adapter, card or the like that may be inserted into a suitable slot or port of the apparatus 110. The communication interface module 330 may support one radio interface technology or a plurality of technologies. FIG. 3 shows one communication unit 330, but the apparatus 110 may comprise a plurality of communication interface modules 330.

The processor 340 may be, e.g., a central processing unit, a microprocessor, a digital signal processor, a graphics processing unit, or the like. FIG. 3 shows one processor 340, but the apparatus 110 may comprise a plurality of processors.

The memory 380 may be for example a non-volatile or a volatile memory, such as a read-only memory, a programmable read-only memory, erasable programmable read-only memory, a random-access memory, a flash memory, a data disk, an optical storage, a magnetic storage, a smart card, or the like. The apparatus 110 may comprise a plurality of memories. The memory 380 may be constructed as a part of the apparatus 110 or the memory 380 may be inserted into a slot, port, or the like of the apparatus 110 by a user. The memory 380 may serve the sole purpose of storing data, or the memory 380 may be constructed as a part of a circuitry serving other purposes, such as processing data.

A skilled person appreciates that in addition to the elements shown in FIG. 3, the apparatus 110 may comprise other elements, such as microphones, displays, as well as additional circuitry such as input/output circuitry, memory chips, application-specific integrated circuits, processing circuitry for specific purposes such as source coding/decoding circuitry, channel coding/decoding circuitry, ciphering/deciphering circuitry, and the like. Additionally, the apparatus 110 may comprise a disposable or rechargeable battery (not shown) for powering the apparatus 110 when external power if external power supply is not available. Likewise, it is appreciated that one or more of the elements described hereinbefore may be dispensed with.

The shown content may be layered to match with the exit pupil expander (EPE) stack properties. If there originally is a continuous or non-restricted depth (e.g. photos) or if there are multiple depth layers in the content, the depth(s) may be detected and the content be compressed accordingly.

Various embodiments have been presented. It should be appreciated that in this document, words comprise, include and contain are each used as open-ended expressions with no intended exclusivity.

Figure 4:
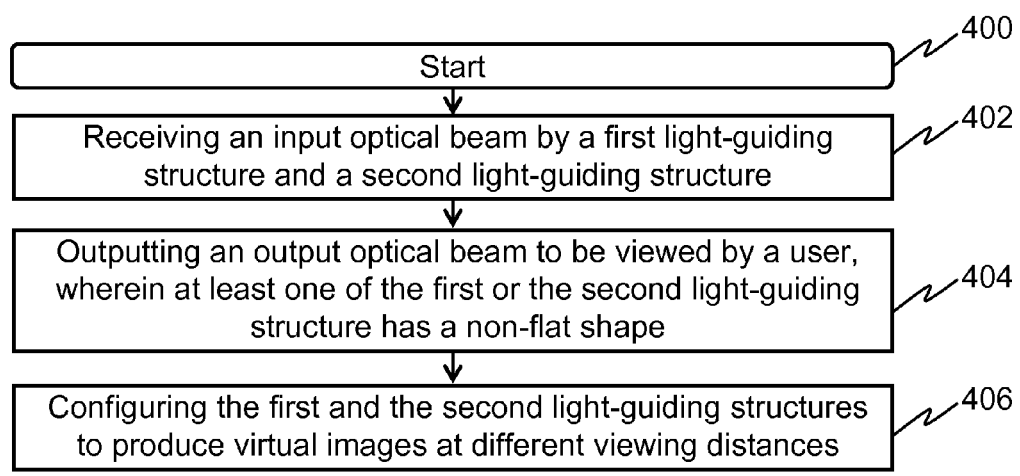
FIG. 4 shows a flow chart illustrating a process according to yet another example embodiment of the invention

FIG. 4 shows a flow chart according to an embodiment of the invention and represents one possible scenario. It is noted that the order of steps shown in FIG. 4 is not absolutely required, so in principle, the various steps can be performed out of order. In a first step 402, first light-guiding structure and a second light-guiding structure are provided to receive input optical beam.

In a next step 404, the output optical beam is output to be viewed by a user, wherein at least one of the first or the second light-guiding structure has a non-flat shape, In a next step 406, the first and the second light-guiding structures are configured to produce virtual images at different viewing distances.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
   a first light-guiding structure configured to guide optical waves, having a first surface and a second surface which is opposite to the first surface;
   a second light-guiding structure configured to guide optical waves, having a first surface and a second surface which is opposite to the first surface;
   a first in-coupling element disposed on the first surface of the first light-guiding structure and configured to receive an input optical beam;
   a second in-coupling element disposed on the first surface of the second light-guiding structure and configured to receive the input optical beam; wherein
   the input optical beam is configured to be controlled by an optical engine comprising at least one lens; and
   wherein the optical engine comprises
   a first shutter placed such that it is aligned with the first in-coupling element and a second shutter placed such that it is aligned with the second in-coupling element;
   a first out-coupling element disposed on the second surface of the first light-guiding structure and being offset from the first in-coupling element and configured to output an output optical beam out of the first light-guiding structure to be viewed by a user;
   a second out-coupling element disposed on the second surface of the second light-guiding structure and being offset from the second in-coupling element and configured to output the output optical beam out of the second light-guiding structure to be viewed by a user;
   wherein the first and the second light-guiding structures have different curvature radii and are arranged in a stack; and
   wherein the first and the second light-guiding structures are respectively configured to produce virtual images at different viewing distances.

2. The apparatus of claim 1, wherein the first and the second light-guiding structures are exit-pupil expanders.

3. The apparatus of claim 1, wherein the input optical beam is generated from a virtual image of a display.

4. The apparatus of claim 3, wherein the display is a field-sequential display with directional properties.

5. The apparatus of claim 1, wherein a curvature radius of at least one of the first and the second light-guiding structures is changeable.

6. The apparatus of claim 1, wherein the first and the second in-coupling elements are diffractive elements.

7. The apparatus of claim 1, wherein the first light-guiding structure has a flat shape and the second light-guiding structure has a non-flat shape.

8. The apparatus of claim 1 further comprising:
   a third light-guiding structure configured to guide optical waves, having a first surface and a second surface which is Opposite to the first surface;
   a third in-coupling element disposed, on the first surface of the third light-guiding structure and configured to receive the input optical beam; and a third shutter placed such that it is aligned with the third in-coupling element; and wherein the first, the second and the third light-guiding structures have different curvature radii.

9. The apparatus of claim 8, wherein the first light-guiding structure, the second light-guiding structure and the third light-guiding structure present different two-dimensional content of different focal distance to the user.

10. The apparatus of claim 1, wherein the optical engine is configured to provide adjustable optical power.

11. A method comprising:

receiving an input optical beam by at least one of a first light-guiding structure and a second light-guiding structure, wherein the first light-guiding structure comprises a first in-coupling element and the second light-guiding element comprises a second in-coupling element;

having a first shutter placed such that it is aligned with the first in-coupling element and a second shutter placed such that it is aligned with the second in-coupling element;

outputting an output optical beam, to be viewed by a user, using the first light-guiding structure when the first shutter is switched on and the second shutter is switched off and using the second light-guiding structure when the first shutter is switched off and the second shutter is switched on, and wherein at least one of the first or the second light-guiding structure has a non-flat shape; and configuring the first and the second light-guiding structures to have curvature radii that define focal distances such that virtual images are produced at different viewing distances, the first and second light-guiding structures being arranged in a stack.

12. The method of claim 11, wherein at least one of the light-guiding structures is an exit-pupil expander.

13. The method of claim 11, wherein the input optical beam is generated from a virtual image of a display.

14. The method of claim 11, wherein a curvature radius of the non-flat shape of the first light-guiding structure is different to the curvature of the non-flat shape of the second light-guiding structure.

15. The method of claim 11, wherein the first light-guiding structure is configured to have a flat shape and the second light-guiding structure is configured to have a non-flat shape.

16. The method of claim 11, comprising a third light-guiding structure configured to guide optical waves, having a first surface and a second surface which is opposite to the first surface, wherein the third light-guiding structure and the second light-guiding structure have different curvature radii.

17. The method of claim 16, wherein the first light-guiding structure, the second light-guiding structure and the third light-guiding structure present different two-dimensional content of different focal distance to the user.

* * * * *